US009208048B2

(12) United States Patent
Chen

(10) Patent No.: US 9,208,048 B2
(45) Date of Patent: Dec. 8, 2015

(54) DETERMINATION METHOD FOR DETERMINING INSTALLATION DIRECTION OF ELECTRONIC DEVICE AND ELECTRONIC SYSTEM

(71) Applicant: Wistron Corporation, New Taipei (TW)

(72) Inventor: Chang-Mei Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/253,876

(22) Filed: Apr. 16, 2014

(65) Prior Publication Data

US 2015/0113179 A1   Apr. 23, 2015

(30) Foreign Application Priority Data

Oct. 23, 2013   (TW) .............................. 102138268 A

(51) Int. Cl.
*G06F 11/30* (2006.01)
*G06F 11/22* (2006.01)

(52) U.S. Cl.
CPC ........ *G06F 11/3051* (2013.01); *G06F 11/2289* (2013.01)

(58) Field of Classification Search
CPC ........... A61M 2209/086; G06F 13/382; G06F 3/0346
See application file for complete search history.

(56) References Cited

U.S. PATENT DOCUMENTS

| | | | | |
|---|---|---|---|---|
| 2009/0178086 A1* | 7/2009 | Unger | ............................. | 725/81 |
| 2009/0243546 A1* | 10/2009 | Sakurai et al. | ................ | 320/134 |
| 2009/0273317 A1* | 11/2009 | Fan et al. | ....................... | 320/145 |
| 2010/0092174 A1* | 4/2010 | Brown et al. | .................... | 398/79 |
| 2010/0103576 A1* | 4/2010 | Sugimoto et al. | ............... | 361/84 |
| 2010/0283623 A1* | 11/2010 | Baxter et al. | ................... | 340/687 |
| 2012/0327546 A1* | 12/2012 | Ichimura et al. | ............. | 361/93.1 |
| 2013/0183045 A1* | 7/2013 | Niiho et al. | .................... | 398/142 |

FOREIGN PATENT DOCUMENTS

| | | |
|---|---|---|
| TW | 201137590 | 11/2011 |
| TW | I377464 | 11/2012 |
| TW | M453891 | 5/2013 |
| WO | 2011084196 A1 | 7/2011 |

OTHER PUBLICATIONS

Office action mailed on Sep. 22, 2015 for the Taiwan application No. 102138268, filing date: Oct. 23, 2013, p. 1 line 12~14, p. 2 and p. 3 line 1.

* cited by examiner

*Primary Examiner* — Hyun Nam
(74) *Attorney, Agent, or Firm* — Winston Hsu; Scott Margo

(57) ABSTRACT

A method is utilized for determining an installation direction of an electronic device. The electronic device is installed on an object and includes a device connector for utilizing a pluggable method to combine with an object connector of the object. A first interface and a second interface are configured in the device connector. When the electronic device is installed on the object by a first direction, the first interface is connected to an object interface of the object connector. When the electronic device is installed on the object by a second direction, a second interface is connected to the object interface of the object connector. The method includes detecting an outside connecting condition of the first interface and the second interface to generate a first result and a second result, and determining the installation direction of the electronic device according to the first result and the second result.

16 Claims, 7 Drawing Sheets

DETERMINATION METHOD FOR DETERMINING INSTALLATION DIRECTION OF ELECTRONIC DEVICE AND ELECTRONIC SYSTEM

BACKGROUND OF THE INVENTION

1. Field of the Invention

The present invention relates to a determination method for determining an installation direction of an electronic device and an electronic system, and more particularly, to a determination method and an electronic system capable of determining an installation direction of an electronic device without configuring an additional identification pin.

2. Description of the Prior Art

With a continuous development of a tablet or other mobile electronic devices, a user may utilize fingers to directly perform touch operations on a touch screen of the tablet, such as to zoom in display content or to zoom out the display content, etc. Recently, the tablet further may be installed on an external keyboard dock to provide the user a way to operate the tablet by an external keyboard (such as an operating manner of a conventional notebook), so as to enhance a usage of the tablet.

Under such a condition, the external keyboard dock is not only configured as a user interface of the tablet, but also the external keyboard dock is configured as an installation dock of the tablet, that is, the external keyboard dock is utilized for installing the tablet for the user to conventionally watch the tablet. Thus, how to effectively determine the two usages for the tablet has become one of the industry goals.

SUMMARY OF THE INVENTION

It is therefore an objective of the present invention to provide a determination method for determining an installation direction of an electronic device and an electronic system capable of determining an installation direction of an electronic device without configuring an additional identification pin.

The present invention discloses a determination method for determining an installation direction of an electronic device, wherein the electronic device is installed on an object and the electronic device utilizes a device connector to combine with an object connector of the object by a pluggable method. The determination method comprises configuring a first device interface and a second device interface in the device connector; configuring an object interface in the object connector; detecting an outside connecting condition of the first device interface and the second device interface to generate a first determination result and a second determination result; and determining the electronic device is installed on the object by a first direction or a second direction according to the first determination result and the second determination result.

The present invention further discloses an electronic system comprising an object comprising an object connector, wherein an object interface is configured in the object connector; and an electronic device, installed on the object. The electronic device comprises a device connector for combining with the object connector by a pluggable method and configuring a first device interface and a second device interface, wherein the first device interface is connected with the object interface when the electronic device is installed on the object by a first direction and the second device interface is connected with the object interface when the electronic device is installed on the object by a second direction; and a control module coupled with the first device interface and the second device interface, comprising a processor; and a storage device, storing a program code to indicate to the processor to perform a determination method. The determination method comprises detecting an outside connecting condition of the first device interface and the second device interface to generate a first determination result and a second determination result; and determining the electronic device is installed on the object by the first direction or the second direction according to the first determination result and the second determination result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
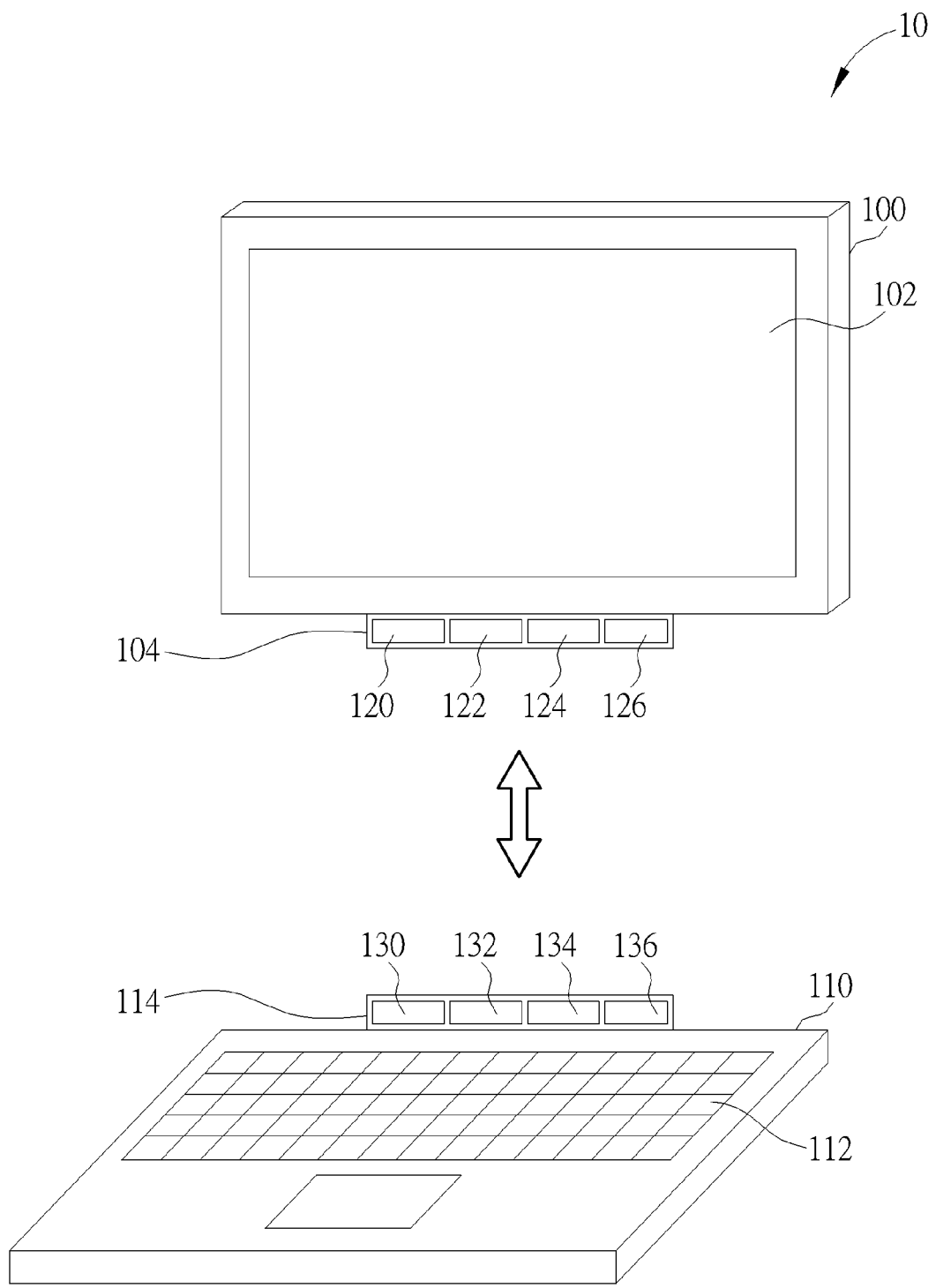
FIG. 1 is an appearance diagram of an electronic system according to an embodiment of the present invention.

Please refer to FIG. 1, which is an appearance diagram of an electronic system 10 according to an embodiment of the present invention. As shown in FIG. 1, the electronic system 10 includes an electronic device 100 and a keyboard 110. The electronic device 100 may be a tablet to configure a touch screen 102 and a device connector 104. The keyboard 110 includes a button part 112 and an object connector 114. The electronic device 100 receives touch commands by the touch screen 102, and when the electronic device 100 is installed on the keyboard 110, the keyboard 110 may be configured as a user interface for the electronic device 100. Additionally, the keyboard 110 may also be an installation dock for the user to conveniently watch a display of the touch screen 102.

In detail, the device connector 104 and the object connector 114 are respectively configured on sides of the electronic device 100 and the keyboard 110. When the electronic device 100 is installed on the keyboard 110, the electronic device 100 may utilize the device connector 104 to combine with the object connector 114 of the keyboard 110 by a pluggable method. Then, the electronic device 100 may transfer signals to communicate with the keyboard 110 through a connection between pins 120-126 configured on the device connector 104 and pins 130-136 configured on the object connector 114. Thereby, in the electronic system 10, the user may perform touch gestures by the screen 102, and the user may also input commands to control the electronic device 100 by the button part 112 of the keyboard 110.

On the other side, an installation direction of the electronic device 100 installed on the keyboard 110 may be a direction of the screen 102 toward to the button part 112 (defined to be a positive installation direction in the following description), or the installation direction of the electronic device 100 installed on the keyboard 110 may also be a direction of the screen 102 backward to the button part 112 (defined to be a negative installation direction in the following description). Thus, when the electronic device 100 is installed on the keyboard 110 by the positive installation direction, the user may face the screen 102 to input data by the button part 112, and when the electronic device 100 is installed on the keyboard 110 by the negative installation direction, the user may face a back of the screen 102 to display displaying contents of the screen 102 to an opposite user, and the opposite user may control the electronic device 100 by the screen 102.

Under such a condition, the device connector 104 of the electronic device 100 is required to be configured to be combined with the object connector 114 by the pluggable method in the positive and negative installation direction. Simultaneously, the pins 120-126 are also required to be electronically connected with the pins 130-136, such that the electronic device 100 may transfer the signals with the keyboard 110 in the positive and negative installation direction. For the connection between the pins 120-126 and the pins 130-136 in the both positive and negative installation direction, the pins 120-126 and the pins 130-136 are required to be configured to be identical and symmetrical pins. For example, since the pin 120 is electrically connected to the pin 130 in the positive installation direction, if pin 120 is configured as a data pin, the pin 130 is the corresponding data pin of the pin 120 for transferring the signals. However, in the negative direction, since the pin 120 is electronically connected to the pin 136, the pin 136 is required to be configured as the data pin similar to the pin 130 for correctly transferring the signals with the pin 120. Therefore, the object connector 114 is also required to configure the identical and symmetrical pins 130 and 136, and accordingly the device connector 104 is also required to configure the identical and symmetrical pins 120 and 126, such that the electronic device 100 may transfer the signals with the keyboard 110 by the pins 120, 126, 130, and 136 in the both positive and negative installation direction.

In general, in order to determine the electronic device 100 is installed on the keyboard 110 by the positive or negative installation direction for automatically performing different operations and display corresponding to the positive or negative installation direction, an identification pin is further configured in the electronic device 100 to determine the installation direction of the electronic device 100 installed on the keyboard 110. In an embodiment, if the pin 122 is an identification pin, the pin 124, 132, and 134 correspondingly are also identification pins. Then, the pin 122 and 124 are respectively connected to a low voltage and a high voltage, the pin 132 is connected to a ground and the pin 134 is floated. As a result, when the electronic device 100 is installed on the keyboard 110 by the positive installation direction, since the pin 122 having a low voltage is connected to the grounded pin 132, the pin 122 still has a low voltage, and since the pin 124 having a high voltage is connected to the floated pin 134, the pin 124 still has a high voltage. The electronic device 100 may determine the pin 122 has a low voltage and the pin 124 has a high voltage to obtain the electronic device 100 is installed on the keyboard 110 by the positive installation direction. On the other hand, when the electronic device 100 is installed on the keyboard 110 by the negative installation direction, since the pin 122 having a low voltage is connected to the floated pin 134, the pin 122 still has a low voltage, and since the pin 124 having a high voltage is connected to the grounded pin 134, the pin 124 has a low voltage. The electronic device 100 may determine the pin 122 has a low voltage and the pin 124 also has a low voltage to obtain the electronic device 100 is installed on the keyboard 110 by the negative installation direction.

However, in the embodiment, the electronic device 100 and the keyboard 110 in electronic system 10 are all required to configure the additional identification pins to determine the installation direction of the electronic device 100 installed on the keyboard 110, such that two identical and symmetrical identification pins are required on the device connector 104 and the object connector 114, so as to cause the manufacturing complexity and cost of the device connector 104 and the object connector 114 to be higher. Thus, the present invention further provides an electronic system capable of reducing the configured pin count to save the manufacturing cost.

Figure 2A:
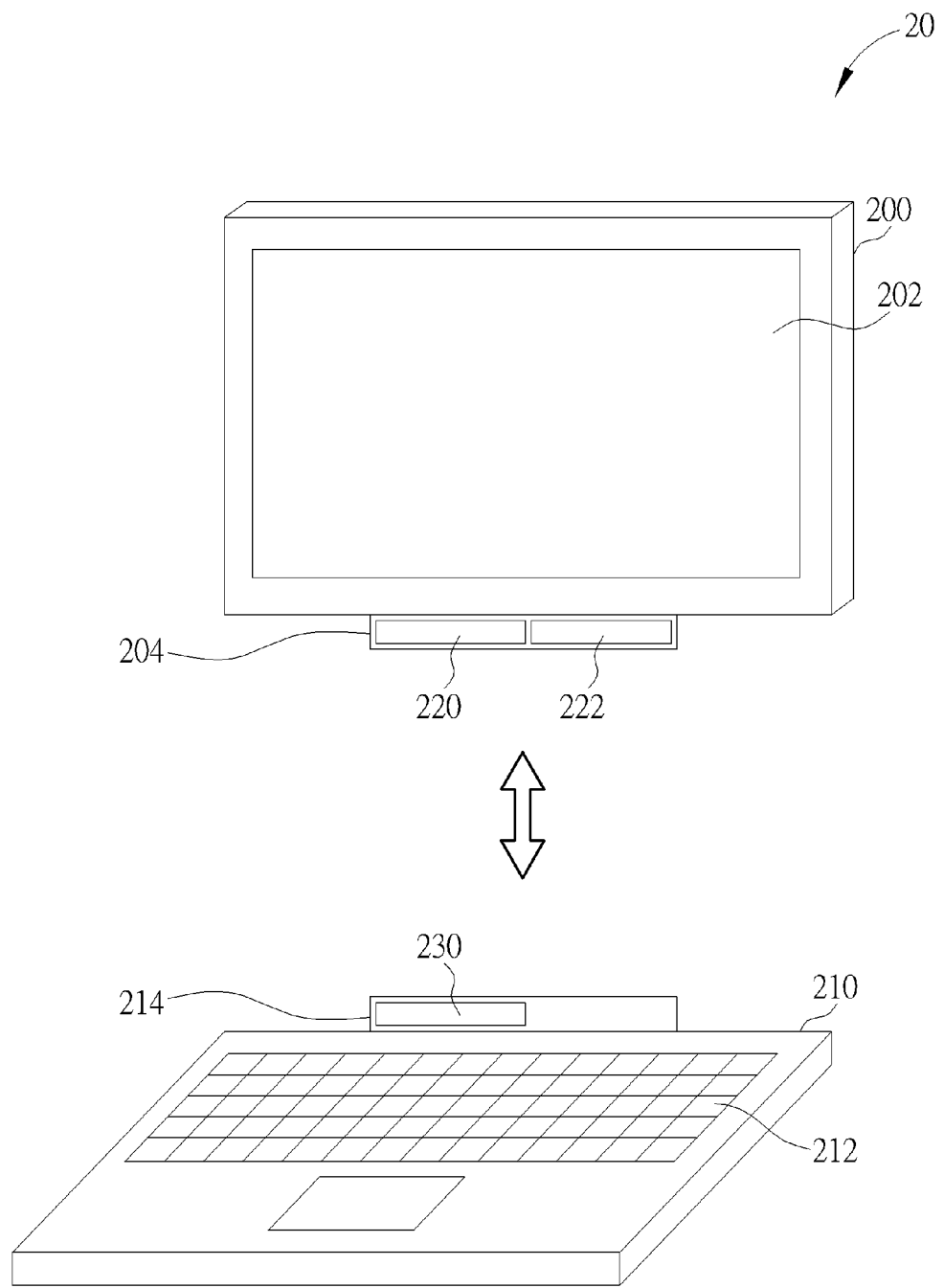
FIG. 2A is an appearance diagram of an electronic device installed on an object by a first direction in an electronic system according to an embodiment of the present invention.
Figure 2B:
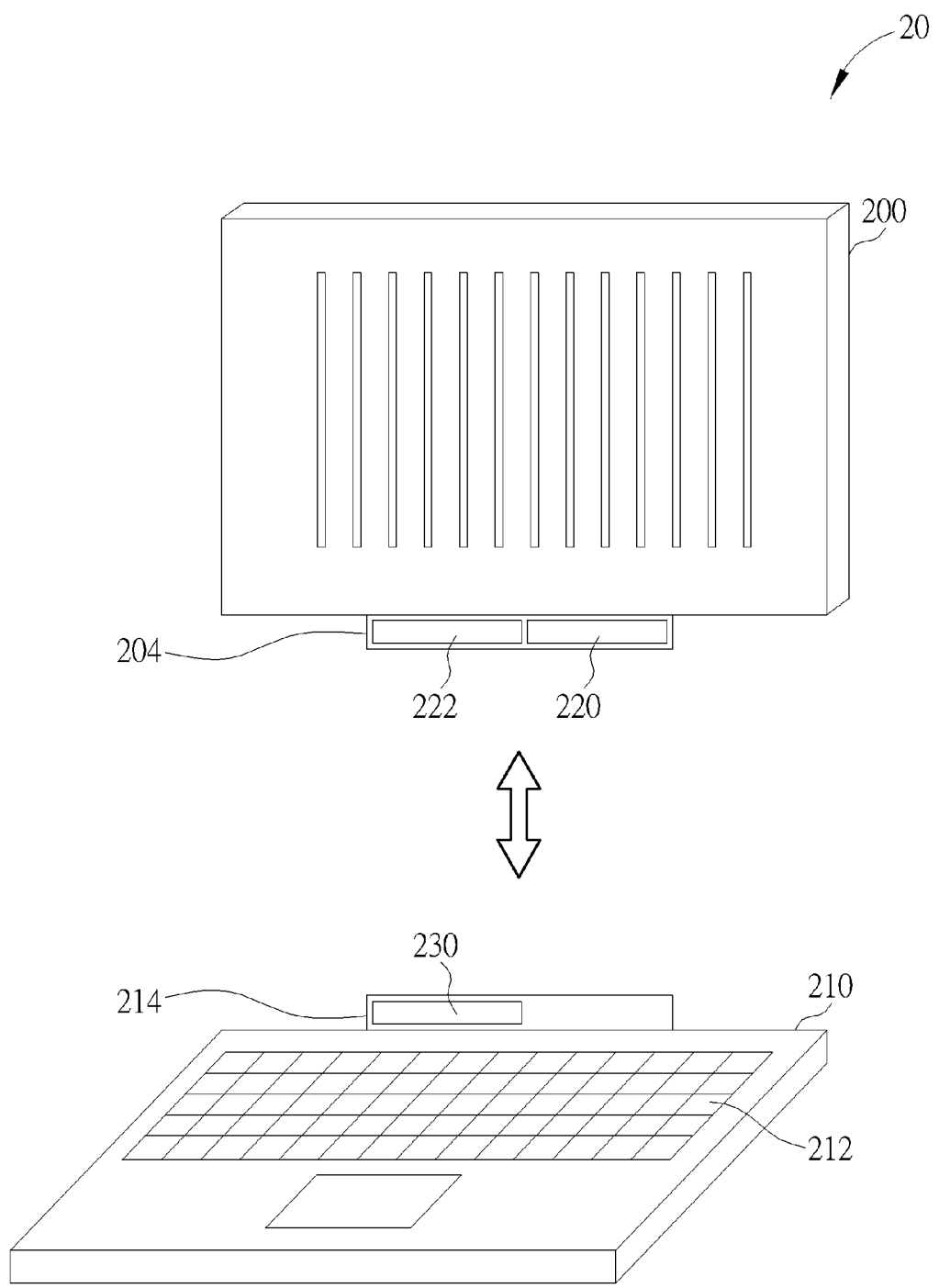
FIG. 2B is an appearance diagram of an electronic device installed on an object by a second direction in an electronic system according to an embodiment of the present invention.
Figure 2C:
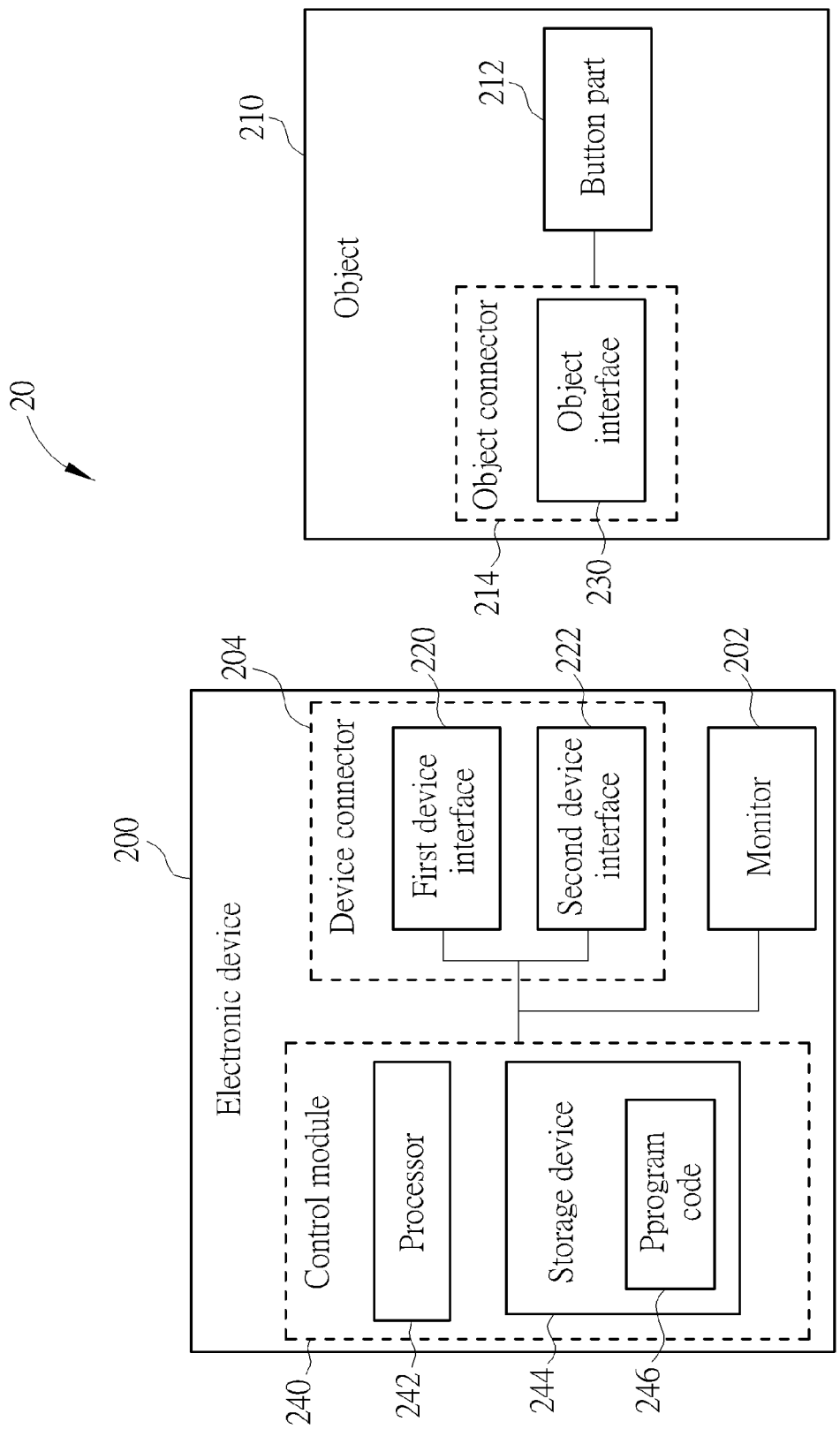
FIG. 2C is a functional diagram of an electronic system in FIG. 2A or FIG. 2B.

Please refer to FIG. 2A to FIG. 2C. FIG. 2A is an appearance diagram of an electronic device 200 installed on an object 210 by a first direction in an electronic system 20 according to an embodiment of the present invention. FIG. 2B is an appearance diagram of the electronic device 200 installed on the object 210 by a second direction in the electronic system 20 according to an embodiment of the present invention. FIG. 2C is a functional diagram of the electronic system 20 in FIG. 2A or FIG. 2B. As shown in FIG. 2A to FIG. 2C, the electronic system 20 comprises the electronic device 200 and the object 210. The electronic device 200 may be a tablet, an e-book reader, or a smart phone, etc. The electronic device 200 includes a monitor 202, a device connector 204, and a control module 240. The screen 202 may be a touch screen for displaying and sensing the touch gesture performed by the user. The device connector 204 is configured on a side of the electronic device 200, and the control module 240 is utilized for performing the main operations of the electronic device 200. The object 210 is a keyboard and includes a button part 212 and an object connector 214. The object 210 may also be a dock with a speaker or a dock with other special functionality, which is not limited. The object connector 214 is configured on a side of the object 210, and the button part 212 has a plurality of buttons for inputting data by the user.

In the electronic system 20, the electronic device 200 may be installed on the object 210 by a first direction (shown in FIG. 2A) or by a second direction (shown in FIG. 2B). The device connector 204 is a pogo connector with pogo pins, and the object connector 214 is also a pogo connector with slots to be combined with the pogo pins of the device connector 204. When the electronic device 200 is installed on the object 210, the device connector 204 configured on the side of the electronic device 200 may be combined with the object connector 214 configured on the side of the object 210 by the pluggable method. The combining method of the device connector 204 and the object connector 214 may also be a method of the object connector 214 with the pogo pins combined with the device connector 204 with the slots, or a method by utilizing other type connectors, etc., which is not limited.

Furthermore, a first device interface 220 and a second device interface 222 are configured on the device connector 204, and an object interface 230 is configured on the object connector 214. The first device interface 220, the second device interface 222, and the object interface 230 comprise a plurality of pins (i.e. the pogo pins or the slots). The plurality of pins are complied with a universal serial bus (USB) standard, which includes a positive data pin, a negative data pin, a power pin (e.g. 5V), and a ground pin. The plurality of pins may also be complied with a peripheral component interconnection express (PCI-express) standard, which includes corresponding defined pins, and may make alternations according to actual requirements.

When the electronic device 200 is installed on the object 210 by the first direction (such as shown in FIG. 2A), the device connector 204 is combined with the object connector 214, and the first device interface 220 is coupled with the object interface 230. Then, the electronic device 200 may transfer the signals to communicate with the object 210 through the first device interface 220 and the object interface 230. On the other hand, when the electronic device 200 is installed on the object 210 by the second direction (such as shown in FIG. 2B), the device connector 204 is combined with the object connector 214, and the second device interface 222 is coupled with the object interface 230. Then, the electronic device 200 may transfer the signals to communicate with the object 210 through the second device interface 222 and the object interface 230. Thus, since the electronic device 200 may communicate with the object 210, the user may input the commands to control the electronic device 200 by the button part 212 of the object 210.

Moreover, as shown in FIG. 2C, in the electronic device 200, the control module 240 is coupled with the screen 202, the first device interface 220, and the second device interface 222. The control module 240 includes a processor 242 and a storage device 244. The processor 242 may be implemented by an application-specific integrated circuit (ASIC). The storage device 244 may be a read-only memory (ROM), a random-access memory (RAM), a CD-ROMs, a magnetic tape, a floppy disk, or an optical data storage device, etc., which is not limited hereinafter. The storage device 244 is utilized for storing a program code 246 to indicate to the processor 242 to perform related controls and operations.

Specifically, the control module 240 may control the screen 202 to display data and may also receive signals corresponding to touch gestures from the screen 202 to perform analyzing to transfer the touch gestures to the commands for controlling the electronic device 200. Additionally, when the electronic device 200 is installed on the object 210 by the first direction (as shown in FIG. 2A), the control module 240 may determine the installation direction of the electronic device 200 to be the first direction according to the electronic connection between the first device interface 220 and the object interface 230. Then, since the first device interface 220 is electrically connected with the object interface 230, the control module 240 may transfer the signals with the object 210 by the first device interface 220. On the other hand, when the electronic device 200 is installed on the object 210 by the second direction (as shown in FIG. 2B), the control module 240 may determine the installation direction of the electronic device 200 to be the second direction according to the electronic connection between the second device interface 220 and the object interface 230. Then, since the second device interface 222 is electrically connected with the object interface 230, the control module 240 may transfer the signals with the object 210 by the second device interface 222.

Thereby, the electronic device 200 is only required to configure the first device interface 220 and the second device interface 222 for transferring the signals, and the electronic device 200 is not required to configure the additional identification pins. Similarly, the object 210 is also only required to configure the object interface 230 for transferring the signals, and the electronic device 200 is not required to configure the additional identification pins and further identical and symmetrical object interface. As a result, the electronic device 200 may determine the installation direction installed on the object 210 and transfer the signals with the object 210, and fewer pins are configured on the device connector 204 and the object connector 214 to save the manufacturing cost.

In detail, if the first device interface 220, the second device interface 222, and the object interface 230 are compiled with the USB standard, the electronic device 200 first outputs a first output signal compiled with the USB standard through the first device interface 220, and simultaneously the electronic device 200 also outputs a second output signal complied with the USB standard through the second device interface 222. Under such a condition, when the electronic device 200 is installed on the object 210 by the first direction, the first output signal from the first device interface 220 is outputted to the coupled object interface 230, and the object 210 may receive the first output signal according to the USB standard. After the object 210 analyzes the first output signal, the object 210 transmits a corresponding response signal to the electronic device 200. When the electronic device 200 is installed on the object 210 by the second direction, the second output signal from the second device interface 220 is outputted to the coupled object interface 230, and the object 210 may receive the second output signal according to the USB standard. After the object 210 analyzes the second output signal, the object 210 transmits a corresponding response signal to the electronic device 200.

Next, the electronic device 200 receives the signals respectively from the first device interface 220 and the second device interface 222 to form a first input signal and a second input signal. The electronic device 200 detects whether the first input signal or the second input signal have a change to generate a first determination result and a second determination result. When the electronic device 200 detects a change of the first input signal, which represents that the response signals from the object 210 may be received by the electronic device 200 through the first device interface 220, the electronic device 200 generates the first determination result to indicate the first device interface 220 is connected with the object interface 230. When the electronic device 200 detects a change of the second input signal, which represents that the response signals from the object 210 may be received by the electronic device 200 through the second device interface 220, the electronic device 200 generates the second determination result to indicate the second device interface 220 is connected with the object interface 230.

Finally, the electronic device 200 determines whether the electronic device is installed on the object 210 by the first direction or the second direction according to the first determination result and the second determination result. When the first determination result indicates the first device interface 220 is connected with the object interface 230, the electronic device 200 may accordingly determine to be installed on the object 210 by the first direction. When the second determination result indicates the second device interface 220 is connected with the object interface 230, the electronic device 200 may accordingly determine to be installed on the object 210 by the second direction.

Notably, if the first determination result indicates the first device interface 220 is connected with the object interface 230 and the second determination result also indicates the second device interface 220 is connected with the object interface 230, or if the first determination result indicates the first device interface 220 is not connected with the object interface 230 and the second determination result also indicates the second device interface 220 is not connected with the object interface 230, the determination result of the first input signal and the second input signal are assumed to be wrong, such as the first input signal and the second input signal have noises or the electronic device 200 is not completely or not yet installed on the object 210. Under such a situation, the electronic device 200 may decide whether to display an error message on the screen 202 according to a configuration of the user to inform the user the wrong determination result. The electronic device 200 may also decide whether to continuously detect the outside connecting condition of the first device interface 220 and the second device interface 222 according to an external keyboard function whether to be disabled by the user. The operations related to the unreasonable first determination result and the unreasonable second determination result may be alternated according to the actual applications and are not limited.

In short, in the electronic system 20, the electronic device 200 may be controlled by the touch gestures performed from the screen 202, and the electronic device 200 may also be installed on the object 210 by the first direction or the second direction to utilize the device connector 204 to be combined with the object connector 214 to transfer the signals with the object 210 through the first device interface 220 or the second device interface 222. Furthermore, after the electronic device 200 outputs the signals by the first device interface 220 and the second device interface 222, the electronic device 200 detects the input signals corresponding to the output signals to obtain whether the first device interface 220 or the second device interface 222 are electronically connected to the object interface 230, so as to determine the installation direction of the electronic device to be the first direction or the second direction. Thereby, the electronic device 200 is only required to configure the transferring interface for transferring the signals to determine the installation direction of the electronic device 200 by the transferring interface, and the electronic device 200 is not required to configure the additional identification pins, so as to decrease the pin counts of the device connector 204 and the object connector 214 for saving the manufacturing cost.

Figure 3:
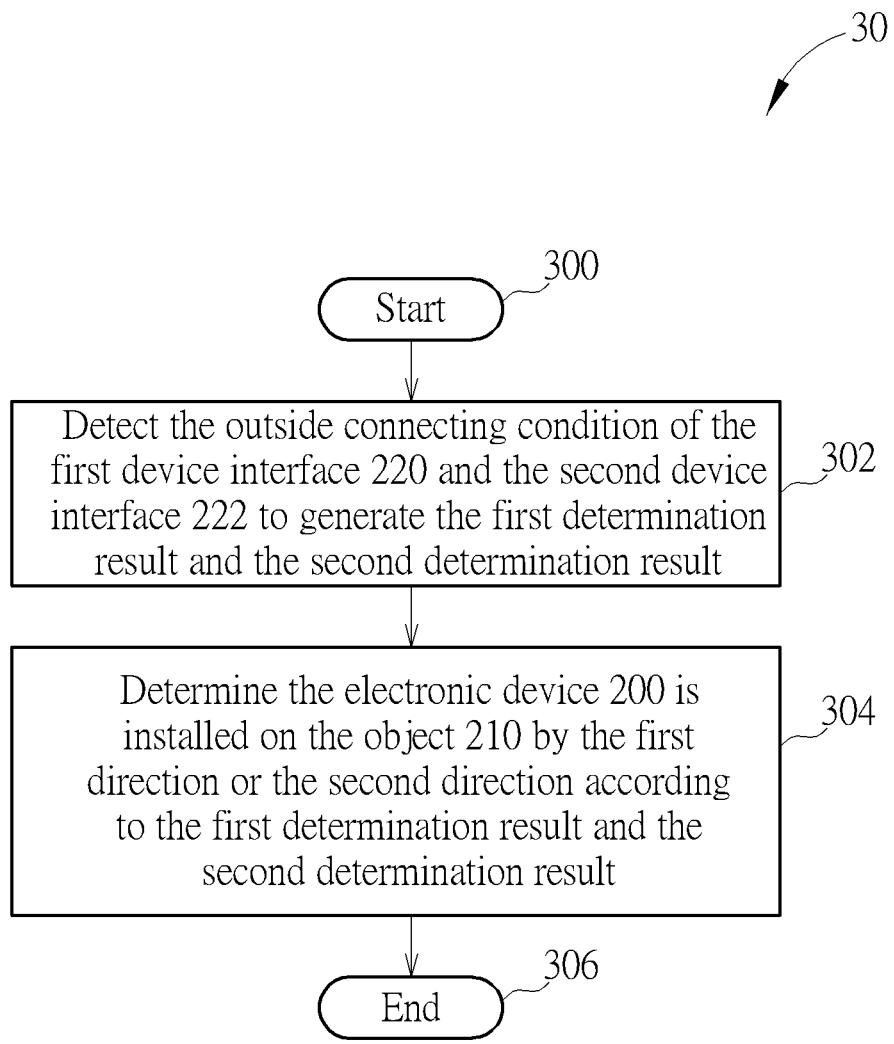
FIG. 3 is a schematic diagram of a determination process for determining an installation direction of an electronic device according to an embodiment of the present invention.

The method of the electronic device 200 determining the installation direction according to the outside connecting condition of the first device interface 220 and the second device interface 222 may be further summarized as a determination process 30. The determination process 30 is performed in the electronic device 200 in FIG. 2C, and may be compiled as the program code 246 stored in the storage device 244 to control the processor 242 to perform determining the installation direction. As shown in FIG. 3, the determination process 30 includes the following steps:

Step 300: start.

Step 302: detect the outside connecting condition of the first device interface 220 and the second device interface 222 to generate the first determination result and the second determination result.

Step 304: determine the electronic device 200 is installed on the object 210 by the first direction or the second direction according to the first determination result and the second determination result.

Step 306: end.

The detail operations of each step in the determination process 30 may refer to the foregoing description of the embodiments and will not be narrated hereinafter.

Figure 4A:
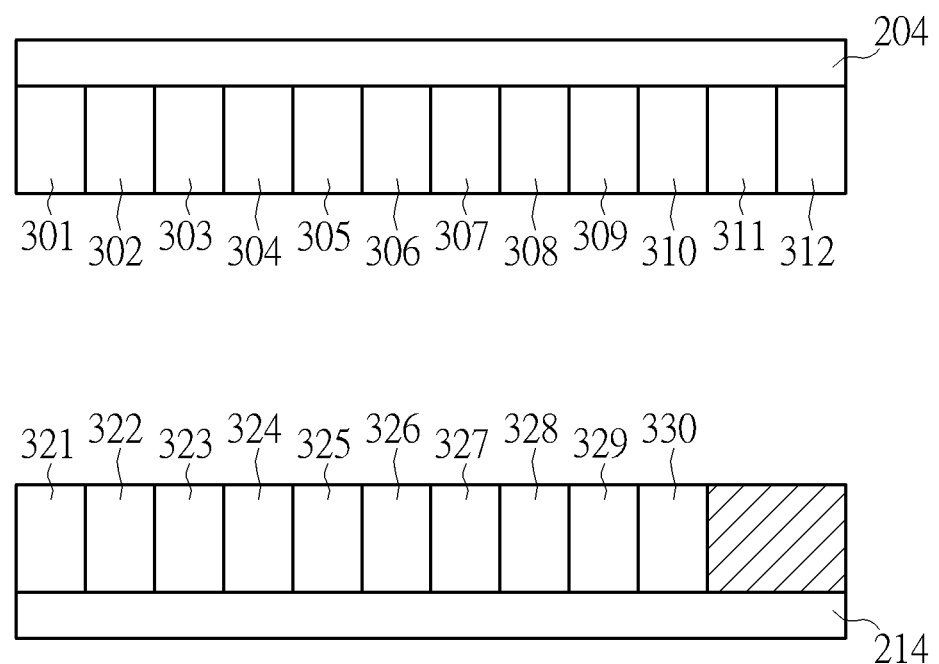
FIG. 4A is a schematic diagram of a device connector combined with an object connector in FIG. 2A according to another embodiment of the present invention.
Figure 4B:
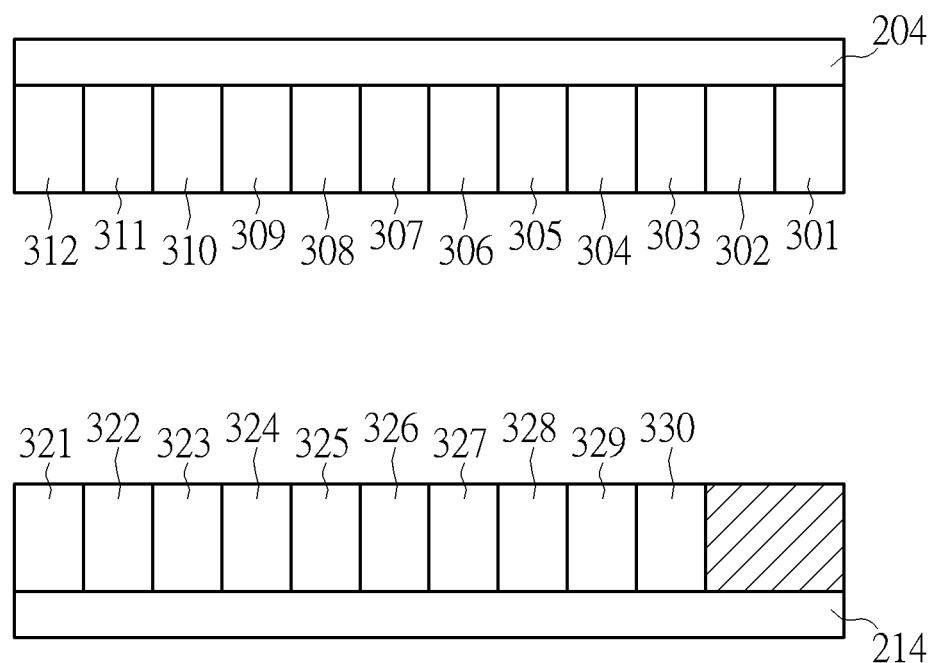
FIG. 4B is a schematic diagram of a device connector combined with an object connector in FIG. 2B according to another embodiment of the present invention.

Moreover, the configuration method of the transferring interface in the device connector 204 and the object connector 214 is also not limited, which may make alterations according to the actual requirements. For example, please refer to FIG. 4A and FIG. 4B. FIG. 4A is a schematic diagram of the device connector 204 combined with the object connector 214 in FIG. 2A according to another embodiment of the present invention. FIG. 4B is a schematic diagram of the device connector 204 combined with the object connector 214 in FIG. 2B according to another embodiment of the present invention. As shown in FIG. 4A and FIG. 4B, the device connector 204 includes pins 301-312. The pins 301, 302, 303, 306 are respectively a negative data pin, a positive data pin, a ground pin, and a power pin to form a first USB interface complied with the USB standard. The pins 312, 311, 310, 307 are respectively a negative data pin, a positive data pin, aground pin, and a power pin to form a second USB interface complied with the USB standard. The pins 301, 302, 303, 306 of the first USB interface and the pins 312, 311, 310, 307 of the second USB interface are symmetrical on the device connector 204.

In addition to the first and second interfaces, the device connector 204 further includes pins 304, 305, which are respectively a clock pin and a data pin, to form a first inter-integrated circuit (I$^2$C) interface complied with an I$^2$C standard. The pins 309, 308 respectively are a clock pin and a data pin to form a second I$^2$C interface complied with the I$^2$C standard. Similarly, the pins 304, 305 of the first I$^2$C interface and the pins 309, 308 of the second I$^2$C interface are also symmetrical on the device connector 204.

Furthermore, the object connector 214 includes pins 321-330. The pins 321, 322, 323, 326 are respectively a negative data pin, a positive data pin, a ground pin, and a power pin to form a third USB interface complied with the USB standard. The pins 324, 325 respectively are a clock pin and a data pin to form a third I$^2$C interface complied with the I$^2$C standard, and the pins 329, 328 respectively are a clock pin and a data pinto form a fourth I$^2$C interface complied with the I$^2$C standard.

Thereby, as shown in FIG. 4A, when the electronic device 200 is installed on the object 210 by the first direction, the first USB interface (i.e. including the pins 301, 302, 303, and 306) is electrically connected to the third USB interface (i.e. including pins 321, 322, 323, and 326). Thus, after the electronic device 200 outputs the first output signal and the second output signal through the first USB interface and the second USB interface, the electronic device 200 may receive the response signal from the object 210 by the first USB interface to detect a change of the signal from the first USB interface to determine the electronic device 200 is installed on the object 210 by the first direction.

On the other hand, as shown in FIG. 4B, when the electronic device 200 is installed on the object 210 by the second direction, the second USB interface (i.e. including the pins 312, 311, 310, and 307) is electrically connected to the third USB interface (i.e. including pins 321, 322, 323, and 326). Thus, after the electronic device 200 outputs the first output signal and the second output signal through the first USB interface and the second USB interface, the electronic device 200 may receive the response signal from the object 210 by the second USB interface to detect a change of the signal from the second USB interface to determine the electronic device 200 is installed on the object 210 by the second direction.

Additionally, when the electronic device 200 is installed on the object 210 by the first direction, the first I$^2$C interface (including the pins 304, 305) is electronically connected to the third I$^2$C interface (including the pins 324, 325), and the second I$^2$C interface (including the pins 309, 308) is electronically connected to the fourth I$^2$C interface (including the pins 329, 328). When the electronic device 200 is installed on the object 210 by the second direction, the first I$^2$C interface (including the pins 304, 305) is electronically connected to the fourth I$^2$C interface (including the pins 329, 328), and the second I$^2$C interface (including the pins 309, 308) is electronically connected to the third I$^2$C interface (including the pins 324, 325). Under such a situation, the electronic device 200 may transmit the control signal to the object 210 and receive the signals from the object 210 by the first, second, third, and fourth I²C interface, when the electronic device 200 is installed on the object by the first or second direction.

Specifically, the first, second, and third USB interfaces are configured on the device connector 204 and the object connector 214 for transferring the signals with high transfer rate, and the first, second, third, and fourth I²C interfaces are configured on the device connector 204 and the object connector 214 for easily transferring the control signal with low transfer rate between the electronic device 200 and the object 210. Then, since the installation direction of the electronic device 200 installed on the object 210 is determined by detecting the outside connecting condition of the first USB interface and the second USB interface, the electronic device 200 and the object 210 are only required to configure the first, second, and third USB interfaces and the first, second, third, and fourth I²C interface rather than to configure the additional identification pins for determining the installation direction of the electronic device 200. The manufacturing complexity and cost of the device connector 204 and the object connector 214 may be decreased.

Notably, the electronic device 200 of the present invention determines the installation direction according to the outside connecting condition of the transferring interface utilized for transferring the signals, and any alterations accordingly belong to the scope of the present invention. For example, in the embodiment, the first input signal and the second input signal are detected whether to have a change to generate the first determination result and the second determination result for indicating whether the first device interface 220 or the second device interface 222 are connected to the object interface 230. However, in other embodiments, current of the pins on the first device interface 220 and the second device interface 222 may also be detected to generate the first determination result and the second determination result for indicating whether the first device interface 220 or the second device interface 222 are connected to the object interface 230. Any methods of determining the installation direction of the electronic device 200 installed on the object 210 by detecting the outside connecting condition of the transferring interface are belong to the scope of the present invention.

Moreover, in addition to the USB standard, the transferring interface may also be complied with a peripheral component interconnection express (PCI-express) standard or a serial advanced technology attachment (SATA) standard, etc., which are not limited. In addition, in the embodiment, the device connector 204 and the object connector 214 are the corresponding pogo connectors, which are not limited and may also be connectors of other types. When the electronic device 200 is installed on the object 210 by the first direction or the second direction, the device connectors and the object connectors, which may be combined together, to electronically connect the pins of the device connectors and the pins of the object connectors for transferring the signal are all adapted to the present inventions.

On the other hand, in the embodiment, the device connector 204 and the object connector 214 are respectively configured on the sides of the electronic device 200 and the object 210 to be combined by the pluggable method. In other embodiments, the device connector 204 and the object connector 214 may also be respectively configured on any locations of the electronic device 200 and the object 210 to be altered to meet aesthetic and practical requirements according to the shapes, sizes and structures of the electronic device 200 and the object 210.

In summary, in the prior art, the electronic device 100 is required to configure the additional pins for determining the installation direction, such that the manufacturing complexity and cost of the device connector 104 and the object connector 114 are higher. In comparison, the present invention determines the installation direction of the electronic device 200 installed on the object 210 according to the outside connecting condition of the transferring interface utilized for transferring the data, and the present invention is not required to configure the additional identification pins to save the manufacturing cost of the device connector 204 and the object connector 214.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A determination method for determining an installation direction of an electronic device, wherein the electronic device is installed on an object and the electronic device utilizes a device connector to combine with an object connector of the object by a pluggable method, the determination method comprising:
   configuring a first device interface and a second device interface in the device connector;
   configuring an object interface in the object connector;
   detecting an outside connecting condition of the first device interface and the second device interface to generate a first determination result and a second determination result; and
   determining the electronic device is installed on the object by a first direction or a second direction according to the first determination result and the second determination result.

2. The determination method of claim 1, wherein the first device interface, the second device interface, and the object interface are a universal serial bus devices.

3. The determination method of claim 1, wherein the first device interface, the second device interface, and the object interface are a peripheral component interconnection express (PCI-express) devices.

4. The determination method of claim 1, wherein the device connector and the object connector are pogo connectors.

5. The determination method of claim 1, wherein the step of detecting the outside connecting condition of the first device interface and the second device interface to generate the first determination result and the second determination result comprises:
   outputting a first output signal and a second output signal respectively through the first device interface and the second device interface;
   detecting a first input signal and a second input signal corresponding to the first output signal and the second output signal inputted through the first device interface and the second device interface; and
   generating the first determination result and the second determination result according to the first input signal and the second input signal.

6. The determination method of claim 5, wherein the step of generating the first determination result and the second determination result according to the first input signal and the second input signal comprises:
   generating the first determination result to indicate the first device interface is connected with the object interface when a change of the first input signal is detected; and generating the second determination result to indicate the second device interface is connected with the object interface when a change of the second input signal is detected.

7. The determination method of claim 1, wherein the step of determining the electronic device is installed on the object by the first direction or the second direction according to the first determination result and the second determination result comprises:
- determining the electronic device is installed on the object by the first direction when the first determination result indicates the first device interface is connected with the object interface; and
- determining the electronic device is installed on the object by the second direction when the second determination result indicates the second device interface is connected with the object interface.

8. The determination method of claim 7 further comprising:
- generating an error message when the first determination result indicates the first device interface is connected with the object interface and the second determination result indicates the second device interface is connected with the object interface; or
- generating the error message when the first determination result indicates the first device interface is not connected with the object interface and the second determination result indicates the second device interface is not connected with the object interface.

9. An electronic system comprising:
- an object, comprising an object connector, wherein an object interface is configured in the object connector; and
- an electronic device, installed on the object, the electronic device comprising:
  - a device connector, for combining with the object connector by a pluggable method and configuring a first device interface and a second device interface, wherein the first device interface is connected with the object interface when the electronic device is installed on the object by a first direction and the second device interface is connected with the object interface when the electronic device is installed on the object by a second direction; and
  - a control module, coupled with the first device interface and the second device interface, comprising:
    - a processor; and
    - a storage device, storing a program code to indicate to the processor to perform a determination method, the determination method comprising:
      - detecting an outside connecting condition of the first device interface and the second device interface to generate a first determination result and a second determination result; and
      - determining the electronic device is installed on the object by the first direction or the second direction according to the first determination result and the second determination result.

10. The electronic system of claim 9, wherein the first device interface, the second device interface, and the object interface are a universal serial bus devices.

11. The electronic system of claim 9, wherein the first device interface, the second device interface, and the object interface are a-peripheral component interconnection express (PCI-express) devices.

12. The electronic system of claim 9, wherein the device connector and the object connector are pogo connectors.

13. The electronic system of claim 9, wherein the step of detecting the outside connecting condition of the first device interface and the second device interface to generate the first determination result and the second determination result comprises:
- outputting a first output signal and a second output signal respectively through the first device interface and the second device interface;
- detecting a first input signal and a second input signal corresponding to the first output signal and the second output signal inputted through the first device interface and the second device interface; and
- generating the first determination result and the second determination result according to the first input signal and the second input signal.

14. The electronic system of claim 13, wherein the step of generating the first determination result and the second determination result according to the first input signal and the second input signal comprises:
- generating the first determination result to indicate the first device interface is connected with the object interface when a change of the first input signal is detected; and
- generating the second determination result to indicate the second device interface is connected with the object interface when a change of the second input signal is detected.

15. The electronic system of claim 9, wherein the step of determining the electronic device is installed on the object by the first direction or the second direction according to the first determination result and the second determination result comprises:
- determining the electronic device is installed on the object by the first direction when the first determination result indicates the first device interface is connected with the object interface; and
- determining the electronic device is installed on the object by the second direction when the second determination result indicates the second device interface is connected with the object interface.

16. The electronic system of claim 15 further comprising:
- generating an error message when the first determination result indicates the first device interface is connected with the object interface and the second determination result indicates the second device interface is connected with the object interface; or
- generating the error message when the first determination result indicates the first device interface is not connected with the object interface and the second determination result indicates the second device interface is not connected with the object interface.

* * * * *